(12) United States Patent
Hagiwara et al.

(10) Patent No.: US 10,907,747 B2
(45) Date of Patent: Feb. 2, 2021

(54) ELECTRICALLY OPERATED VALVE SYSTEM

(71) Applicant: TOYOTA JIDOSHA KABUSHIKI KAISHA, Toyota (JP)

(72) Inventors: Takaharu Hagiwara, Okazaki (JP); Masato Nonaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 16/411,246

(22) Filed: May 14, 2019

(65) Prior Publication Data

US 2020/0072374 A1 Mar. 5, 2020

(30) Foreign Application Priority Data

Aug. 28, 2018 (JP) .................. 2018-159698

(51) Int. Cl.
| | |
|---|---|
| *F16K 31/04* | (2006.01) |
| *H02P 7/06* | (2006.01) |
| *H02P 3/06* | (2006.01) |
| *H02P 1/16* | (2006.01) |
| *F16K 31/06* | (2006.01) |
| *H01M 8/04082* | (2016.01) |

(52) U.S. Cl.
CPC ........ *F16K 31/046* (2013.01); *F16K 31/0675* (2013.01); *H01M 8/04201* (2013.01); *H02P 1/16* (2013.01); *H02P 3/06* (2013.01); *H02P 7/06* (2013.01)

(58) Field of Classification Search
CPC .. F16K 31/042; F16K 31/046; F16K 31/0675; H02P 1/18; H02P 7/08; H02P 7/18; H02P 1/445

USPC ...................... 251/129.11; 361/160
See application file for complete search history.

(56) References Cited

U.S. PATENT DOCUMENTS

| | | | |
|---|---|---|---|
| 6,577,488 B1 * | 6/2003 | Seifert | F02D 41/20 361/156 |
| 7,161,787 B2 * | 1/2007 | Joens | H03K 17/04106 361/140 |
| 7,542,261 B2 * | 6/2009 | Livoti | F04B 17/04 361/139 |

(Continued)

FOREIGN PATENT DOCUMENTS

JP 2006-074928 A 3/2006

*Primary Examiner* — Seth W. Mackay-Smith
(74) *Attorney, Agent, or Firm* — Oliff PLC

(57) ABSTRACT

An electrically operated valve system includes: a first switching element and a second switching element connected in series to an electric power supply; a third switching element and a fourth switching element connected in series to the electric power supply; diodes; a coil connected between a first middle point and a second middle point, the coil being wired such that a valve opens when the second switching element and the third switching element are opened and the first switching element and the fourth switching element are closed; a shutoff switch configured to shut off a path between a positive electrode of the first switching element and the electric power supply; and a capacitor connected at one end of the capacitor between the shutoff switch and the first switching element and connected at the other end of the capacitor to the negative electrode of the electric power supply.

3 Claims, 8 Drawing Sheets

(56) References Cited

U.S. PATENT DOCUMENTS

| | | | | |
|---|---|---|---|---|
| 8,505,573 | B2* | 8/2013 | Herbert | F16K 37/00 |
| | | | | 137/554 |
| 8,611,064 | B2* | 12/2013 | Lin | H01F 13/00 |
| | | | | 361/143 |
| 9,531,260 | B2* | 12/2016 | Knoedgen | H02P 1/18 |
| 9,856,993 | B2* | 1/2018 | Fuchs | F16K 31/082 |
| 2012/0126764 | A1* | 5/2012 | Urakabe | H02M 3/07 |
| | | | | 323/282 |
| 2012/0327549 | A1* | 12/2012 | Chaly | H01H 33/6662 |
| | | | | 361/160 |
| 2017/0138502 | A1* | 5/2017 | Fletcher | F16K 3/0254 |
| 2018/0209365 | A1* | 7/2018 | Aono | F02D 41/20 |

\* cited by examiner

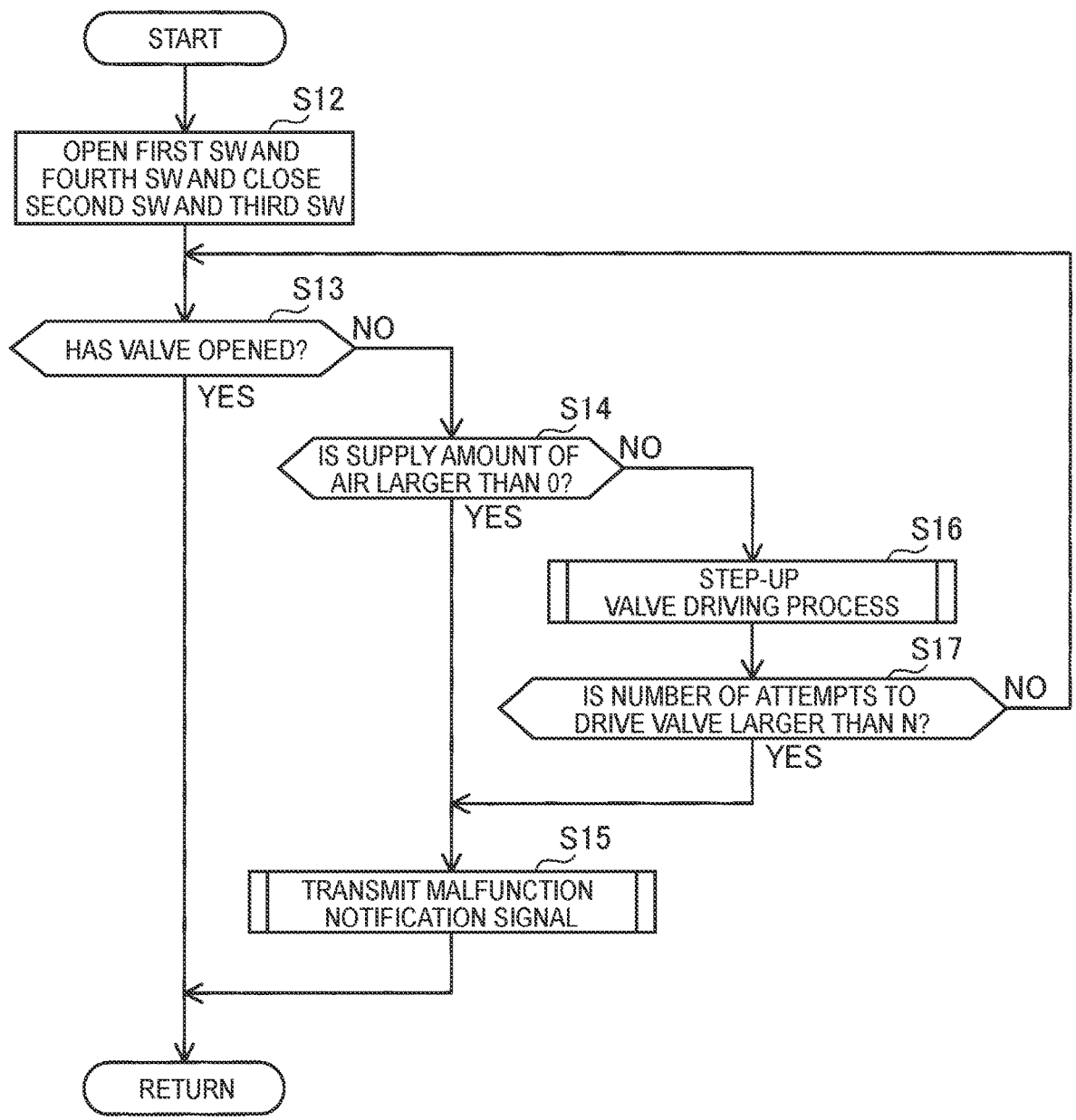

ELECTRICALLY OPERATED VALVE SYSTEM

INCORPORATION BY REFERENCE

The disclosure of Japanese Patent Application No. 2018-159698 filed on Aug. 28, 2018 including the specification, drawings and abstract is incorporated herein by reference in its entirety.

BACKGROUND

1. Technical Field

The art disclosed by the present specification relates to an electrically operated valve system.

2. Description of Related Art

There is an electrically operated valve system that opens/closes a valve by causing current to flow through a coil. Japanese Patent Application Publication No. 2006-74928 (JP 2006-74928 A) discloses an electrically operated valve system employing an H-bridge circuit. The H-bridge circuit is used to change over the direction of current caused to flow through a coil. When the current is caused to flow through the coil in one direction, a valve opens. When the current is caused to flow through the coil in the opposite direction, the valve closes. The H-bridge circuit is equipped with first to fourth switching elements, and diodes that are connected in antiparallel to the switching elements respectively. The first switching element and the second switching element are connected in series to each other between a positive electrode and a negative electrode of an electric power supply. The third switching element and the fourth switching element are also connected in series to each other between the positive electrode and the negative electrode of the electric power supply. The second switching element is connected to a negative electrode side of the first switching element, and the fourth switching element is connected to a negative electrode side of the third switching element. Incidentally, the designations of the first to fourth switching elements are used for the sake of convenience with a view to simply distinguishing the four switching elements from one another.

The coil is connected between a middle point of the first switching element and the second switching element and a middle point of the third switching element and the fourth switching element. When the second switching element and the third switching element are opened and the first switching element and the fourth switching element are closed, the current flows through the first switching element, the coil, and the fourth switching element in this order, and the valve opens. When the first switching element and the fourth switching element are opened and the second switching element and the third switching element are closed, the current flows through the coil in the opposite direction, and the valve closes.

SUMMARY

In the case where the valve is used in a low-temperature environment or the like, the valve freezes and may not be opened by a normal driving force. Alternatively, in the case where the load (water pressure or the like) applied to the valve becomes excessive as well, the valve may not be opened by the normal driving force. The art disclosed by the present specification realizes an electrically operated valve system that can cause an actuator for a valve to produce a larger driving force than usual, by adding some components to the structure of an H-circuit.

The electrically operated valve system disclosed by the present specification adds a shutoff switch and a capacitor to the H-circuit. There is an electrically operated valve system that is equipped with a capacitor for suppressing the pulsation of current. In the case of such a type, it is sufficient to add a shutoff switch. Part of the H-circuit is utilized as a step-up converter to charge the capacitor at a voltage equal to or higher than the voltage of an electric power supply. When the electric power of the capacitor is discharged, a voltage equal to or higher than the voltage of the electric power supply can be applied to a coil. That is, an actuator including the coil can be caused to produce a driving force larger than the normal driving force resulting from the voltage of the electric power supply.

The electrically operated valve system according to an aspect disclosed by the present specification includes a first switching element and a second switching element connected in series to each other between a positive electrode and a negative electrode of an electric power supply, a third switching element and a fourth switching element connected in series to each other between the positive electrode and the negative electrode, diodes connected in antiparallel to the first switching element, the second switching element, the third switching element, and the fourth switching element respectively, a coil connected between a first middle point and a second middle point, the first middle point being a point of series connection of the first switching element and the second switching element, the second middle point being a point of series connection of the third switching element and the fourth switching element, the coil being wired such that a valve opens when the second switching element and the third switching element are opened and the first switching element and the fourth switching element are closed, a shutoff switch configured to shut off a path between a positive electrode of the first switching element and the electric power supply, and a capacitor connected at one end of the capacitor between the shutoff switch and the first switching element and connected at the other end of the capacitor to the negative electrode of the electric power supply. Each of the diodes forms a bypass passage that causes the current to flow from the negative electrode side of the corresponding one of the switching elements to the positive electrode side thereof. Such a diode may be referred to as a reflux diode. The art disclosed by the present specification may adopt an antiparallel circuit that includes switching elements and diodes and that is realized with one chip, such as an RC-IGBT or the like.

The coil of the actuator that opens/closes the valve is connected between the middle point of series connection of the first switching element and the second switching element, and the middle point of series connection of the third switching element and the fourth switching element. The coil of the actuator and the first to fourth switching elements are wired such that the valve opens when the second switching element and the third switching element are opened and the first switching element and the fourth switching element are closed. The shutoff switch is arranged in such a manner as to shut off the path between the positive electrode of the first switching element and the electric power supply. The capacitor is connected at one end thereof between the shutoff switch and the first switching element, and is connected at the other end thereof to the negative electrode of the electric power supply.

The controller of the electrically operated valve system repeatedly opens/closes the second switching element while holding the shutoff switch, the first switching element, and the fourth switching element open (off) and holding the third switching element closed (on). When the second switching element is closed, a current flows from the electric power supply to the coil, and electric energy is stored in the coil. The current flows through the coil in such a direction as to close the valve. However, the above-mentioned process is performed when the valve remains closed. Therefore, even when the current flows in such a direction as to close the valve, the state of the valve does not change.

When the controller opens the second switching element, the path between the coil and the negative electrode of the electric power supply is shut off. At this time, a current flows through the capacitor through the reflux diode of the first switching element, due to an induced electromotive force of the coil. A voltage higher than the output voltage of the electric power supply is applied to the capacitor due to the induced electromotive force of the coil. That is, the output voltage of the electric power supply is stepped up and applied to the capacitor. While the second switching element is repeatedly opened/closed, the voltage at both ends of the capacitor exceeds the output voltage of the electric power supply. When the voltage of the capacitor exceeds the threshold voltage higher than the output voltage of the electric power supply, the controller opens (turns off) the second switching element and the third switching element, and closes (turns on) the first switching element and the fourth switching element. Incidentally, the shutoff switch is held open. The electric power of the capacitor flows to the coil through the first switching element and the fourth switching element. At this time, a current flows through the coil at a voltage higher than the output voltage of the electric power supply. As described previously, the current at this time flows in such a direction as to open the valve. The current flows in such a direction as to open the valve, at a voltage higher than the voltage of the electric power supply. That is, the actuator including the coil can be caused to produce a driving force larger than the normal driving force resulting from the voltage of the electric power supply.

In the aforementioned aspect, the electrically operated valve system may further include a controller that is configured to control the first switching element, the second switching element, the third switching element, the fourth switching element, and the shutoff switch. The controller may be configured to repeatedly open and close the second switching element until a voltage of the capacitor exceeds a threshold voltage higher than an output voltage of the electric power supply, while holding the shutoff switch, the first switching element, and the fourth switching element open and holding the third switching element closed, and open the second switching element and the third switching element and close the first switching element and the fourth switching element when the voltage of the capacitor exceeds the threshold voltage.

In the aforementioned aspect, the controller may be configured to repeatedly open and close the second switching element until the voltage of the capacitor exceeds the threshold voltage higher than the output voltage of the electric power supply, while holding the shutoff switch, the first switching element, and the fourth switching element open and holding the third switching element closed, and open the second switching element and the third switching element and close the first switching element and the fourth switching element when the voltage of the capacitor exceeds the threshold voltage, in a case where the valve cannot be opened by the output voltage of the electric power supply.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein:

FIG. 9 is a flowchart of a process performed by a controller in the fuel cell system.

DETAILED DESCRIPTION OF EMBODIMENT

Figure 1:
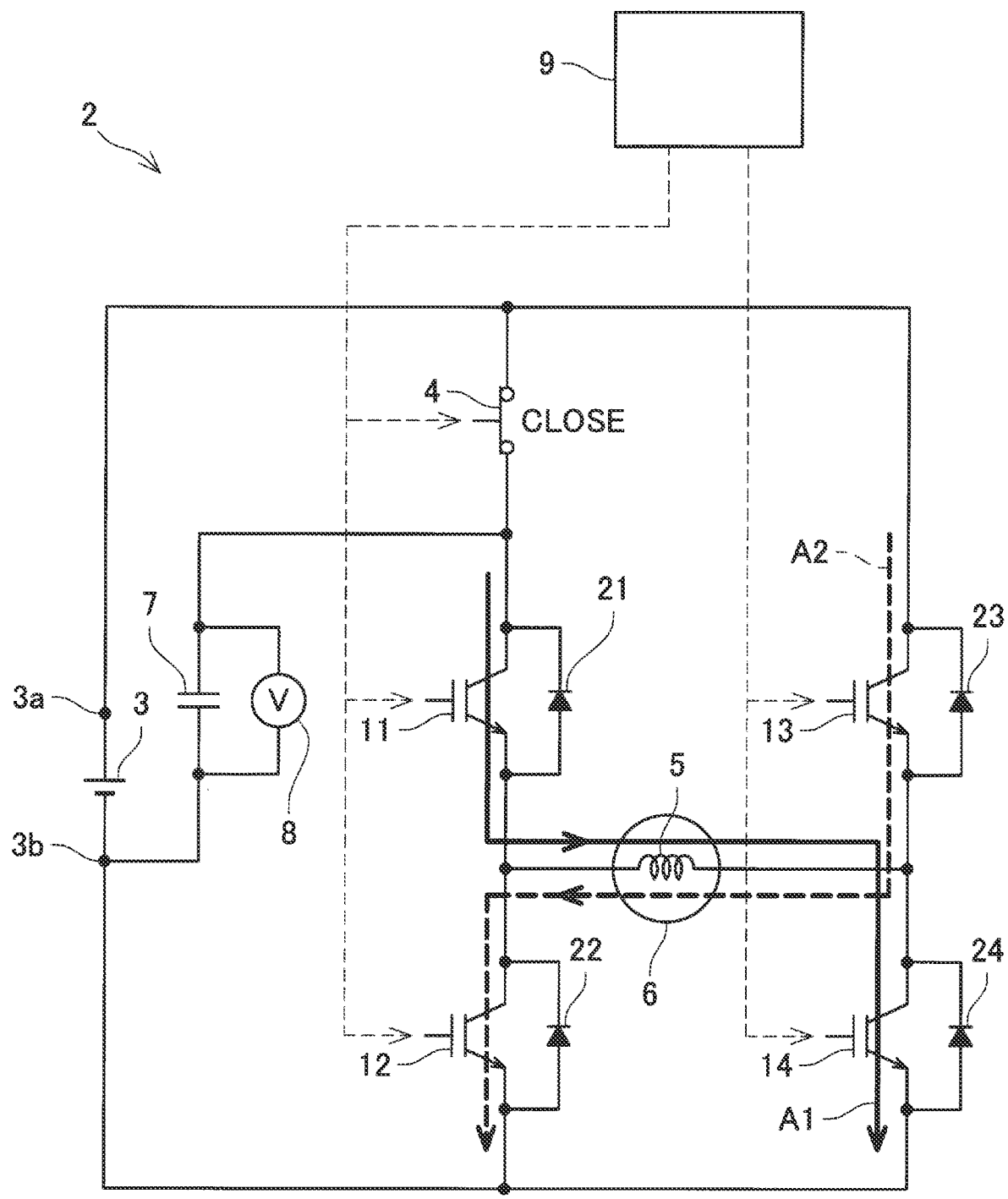
FIG. 1 is a circuit diagram of a valve system according to the embodiment.

An electrically operated valve system 2 according to the embodiment will be described with reference to the drawings. FIG. 1 is a circuit diagram showing the electrically operated valve system 2. A motor 6 including a coil 5 is an actuator that opens/closes a valve. FIG. 1 is a circuit diagram, so a valve body is not depicted. The valve body will be described later with reference to FIGS. 2 and 3. For the sake of convenience of explanation, the electrically operated valve system 2 will be referred to hereinafter simply as the valve system 2.

The valve system 2 is equipped with four switching elements 11 to 14, four diodes 21 to 24, a shutoff switch 4, a capacitor 7, a voltage sensor 8, a controller 9, and a motor 6 including a coil 5. The valve system 2 is connected to an electric power supply 3. The electric power supply 3 is a DC electric power supply.

The switching elements 11 to 14 are typically transistors. The first switching element 11 and the second switching element 12 are connected in series to each other. The third switching element 13 and the fourth switching element 14 are also connected in series to each other. The first switching element 11 is connected to a positive electrode side of the second switching element 12, and the third switching element 13 is connected to a positive electrode side of the fourth switching element 14. In the case of an n-type transistor, "the positive electrode side of the switching element" is equivalent to a collector or a drain.

The first switching element 11 and the second switching element 12 are connected in series to each other between a positive electrode 3a and a negative electrode 3b of the electric power supply 3. The third switching element 13 and the fourth switching element 14 are also connected in series to each other between the positive electrode 3a and the negative electrode 3b. The shutoff switch 4 is connected between a positive electrode of the first switching element 11 and the positive electrode 3a of the electric power supply 3. The shutoff switch 4 is a switch that electrically disconnects the positive electrode 3a of the electric power supply 3 and the first switching element 11 from each other. A transistor may be employed as the shutoff switch 4, but this transistor is desired to be of a normally-closed type. A normally-closed type switch makes both ends thereof conductive with each other when no electric power is supplied thereto. That is, the shutoff switch 4 is desired to be normally closed. The opening/closing of the shutoff switch 4 does not have any influence on the connection of the electric power supply 3 and the third switching element 13.

The coil 5 of the motor 6 is connected at one end thereof to a middle point of series connection of the first switching element 11 and the second switching element 12. The coil 5 is connected at the other end thereof to a middle point of series connection of the third switching element 13 and the fourth switching element 14. The switching elements 11 to 14 and the coil 5 constitute an H-circuit. The H-circuit is used to reverse the direction of the current flowing through the coil 5. The coil 5 is wired such that a valve opens when the second switching element 12 and the third switching element 13 are opened and the first switching element 11 and the fourth switching element 14 are closed. In other words, the coil 5 is wired such that the valve closes when the first switching element 11 and the fourth switching element 14 are opened and the second switching element 12 and the third switching element 13 are closed. A thick directional line A1 in FIG. 1 indicates a current path in opening the valve. A thick broken directional line A2 in FIG. 1 indicates a current path in closing the valve.

The capacitor 7 is connected at one end thereof between the shutoff switch 4 and the first switching element 11. The capacitor 7 is connected at the other end thereof to the negative electrode 3b of the electric power supply 3. The capacity of the capacitor 7 ranges, for example, from several tens of microfarads to several hundreds of microfarads. When the shutoff switch 4 is closed, the capacitor 7 functions as a smoothing capacitor that suppresses pulsation of the current flowing through the first switching element 11.

The controller 9 controls the switching elements 11 to 14 and the shutoff switch 4. The shutoff switch 4 is normally closed. The controller 9 controls the motor 6 in accordance with a command from a host controller (not shown). That is, the controller 9 controls the valve in accordance with a command from the host controller (not shown).

Figure 2:
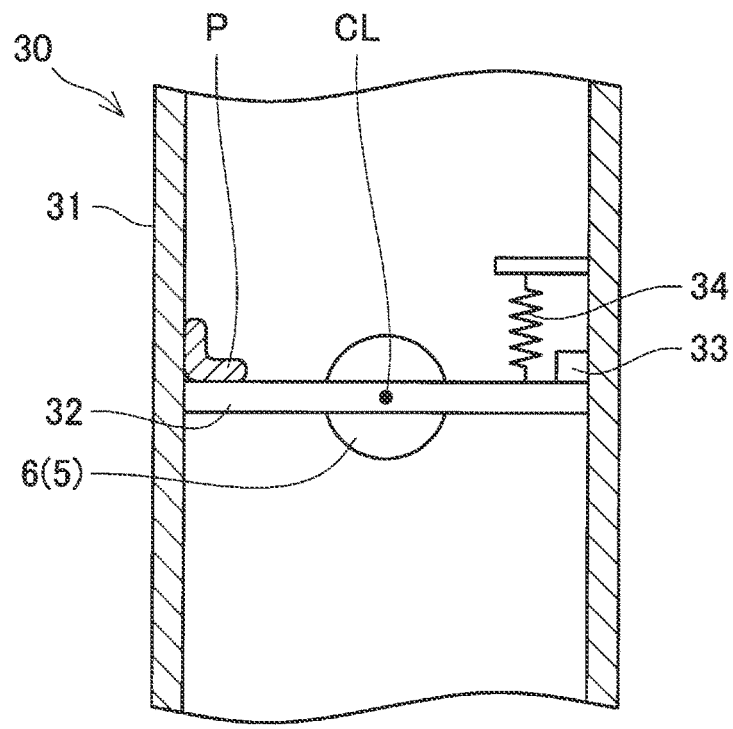
FIG. 2 is a schematic view showing the structure of a valve (with the valve closed)
Figure 3:
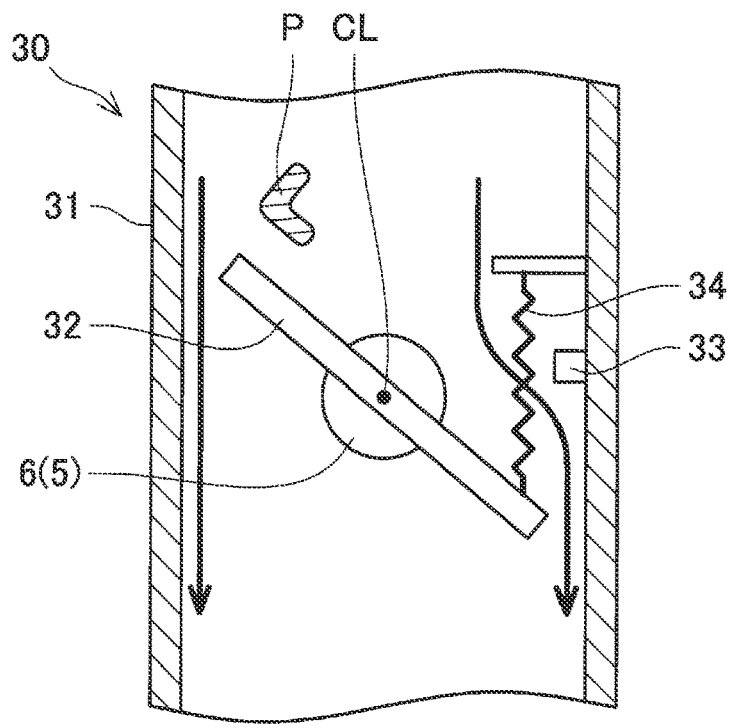
FIG. 3 is a schematic view showing the structure of the valve (with the valve open)

A valve body 30 will be described with reference to FIGS. 2 and 3. Each of FIGS. 2 and 3 is a schematic view illustrating the structure of the valve body 30. FIG. 2 shows a state where a valve 32 is closed, and FIG. 3 shows a state where the valve 32 is open.

The valve body 30 is equipped with a housing 31 through which fluid flows, the valve 32, the motor 6, and a retention spring 34. The valve 32 is rotatably supported inside the housing 31, around a rotary shaft CL. The valve 32 can make a changeover between a state where the interior of the housing 31 is blocked (i.e., closed) and a state where the interior of the housing 31 is in communication (i.e., open). The valve 32 is driven by the motor 6. The range of rotation of the valve 32 is limited by a stopper 33 that is provided inside the housing 31. The valve 32 is closed when it abuts on the stopper 33 (FIG. 2). The valve 32 is open when it is spaced apart from the stopper 33 (FIG. 3). Thick directional lines in FIG. 3 indicate the flow of the fluid passing through the valve 32.

The retention spring 34 is attached to the valve 32. With the valve 32 closed, the valve 32 is held closed due to a tensile force of the retention spring 34, even when the motor 6 is not energized. In the case where the motor 6 is not energized with the valve 32 open, the valve 32 is not closed by the tensile force of the retention spring 34 alone, due to a frictional force of the motor 6. As described previously, in the circuit diagram of FIG. 1, the valve 32 does not close unless the first switching element 11 and the fourth switching element 14 are closed and the second switching element 12 and the third switching element 13 are opened.

When an ice block P has adhered to the valve 32 and the housing 31, the valve 32 may not be opened by a normal driving force of the motor 6. It should be noted herein that the normal driving force of the motor 6 is a driving force that is obtained from the output voltage of the electric power supply 3. In such a case, the valve system 2 can move the valve 32 by a larger driving force than usual. The valve system 2 stores electric power into the capacitor 7 by utilizing the coil 5 of the motor 6, the second switching element 12, and the diode 21 as a step-up converter. When the voltage of the capacitor 7 exceeds the output voltage of the electric power supply 3, the electric power of the capacitor 7 is supplied to the coil 5. A current is supplied from the capacitor 7 to the coil 5 at a voltage exceeding the output voltage of the electric power supply 3. Therefore, the motor 6 can exert a driving force exceeding the normal driving force. Incidentally, as described previously, the capacitor 7 usually functions as a smoothing capacitor. The capacity of the capacitor 7 ranges from several tens of microfarads to several hundreds of microfarads. Such a capacity is sufficient to accumulate the electric power for driving the valve 32 only for a short period of time (several milliseconds).

Even in the case where the ice block P cannot be removed by the normal driving force, it may become possible to remove the ice block P by moving the valve 32 by a driving force exceeding the normal driving force. In the case where dust has been trapped between the valve 32 and an inner wall of the housing 31 etc. as well as the case of the ice block, the valve 32 may not be opened by the normal driving force. Alternatively, the valve 32 may not be opened by the normal driving force also in the case where the fluid pressure is excessively high. Even in such a case, it may be possible to open the valve 32 by a driving force exceeding the normal driving force. A process of opening the valve 32 at a voltage exceeding the output voltage of the electric power supply 3 will be referred to hereinafter as a step-up valve driving process.

Figure 4:
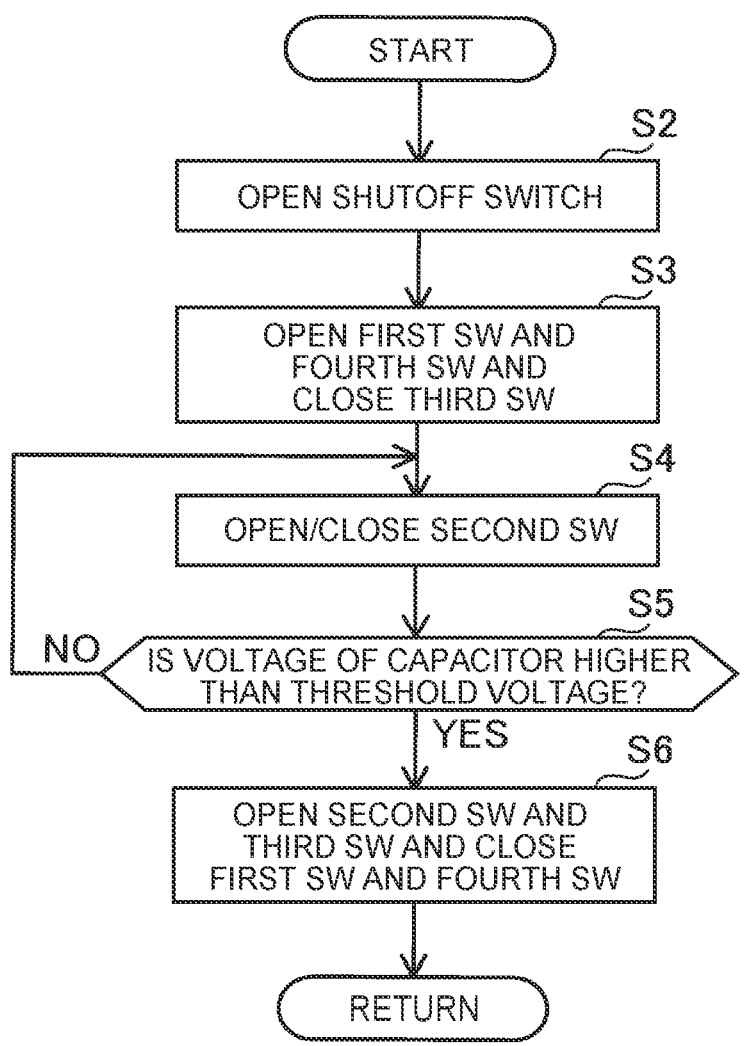
FIG. 4 is a flowchart of a step-up valve driving process.

FIG. 4 is a flowchart showing the step-up valve driving process. When the valve 32 is not opened by a driving force resulting from the output voltage of the electric power supply 3, the controller 9 performs the step-up valve driving process. A sensor that detects an open/closed state of the valve 32 is attached to the valve body 30. The controller 9 can be informed of the open/closed state of the valve 32, from sensor information. Each sign "SW" in FIG. 4 means "switching element(s)".

In the step-up valve driving process, the controller 9 first opens the shutoff switch 4 (step S2). By opening the shutoff switch 4, the positive electrode of the first switching element 11 is electrically disconnected from the positive electrode 3a of the electric power supply 3. Before the shutoff switch 4 is opened, the capacitor 7 is connected to the positive electrode 3a, so the voltage of the capacitor 7 is equal to the output voltage of the electric power supply 3.

Subsequently, the controller 9 opens the first switching element 11 and the fourth switching element 14, and closes the third switching element 13 (step S3). While repeating the following steps S4 and S5, the controller 9 holds the first switching element 11 and the fourth switching element 14 open, and holds the third switching element 13 closed. While holding the above-mentioned state, the controller 9 opens/closes the second switching element 12 (step S4).

Figure 5:
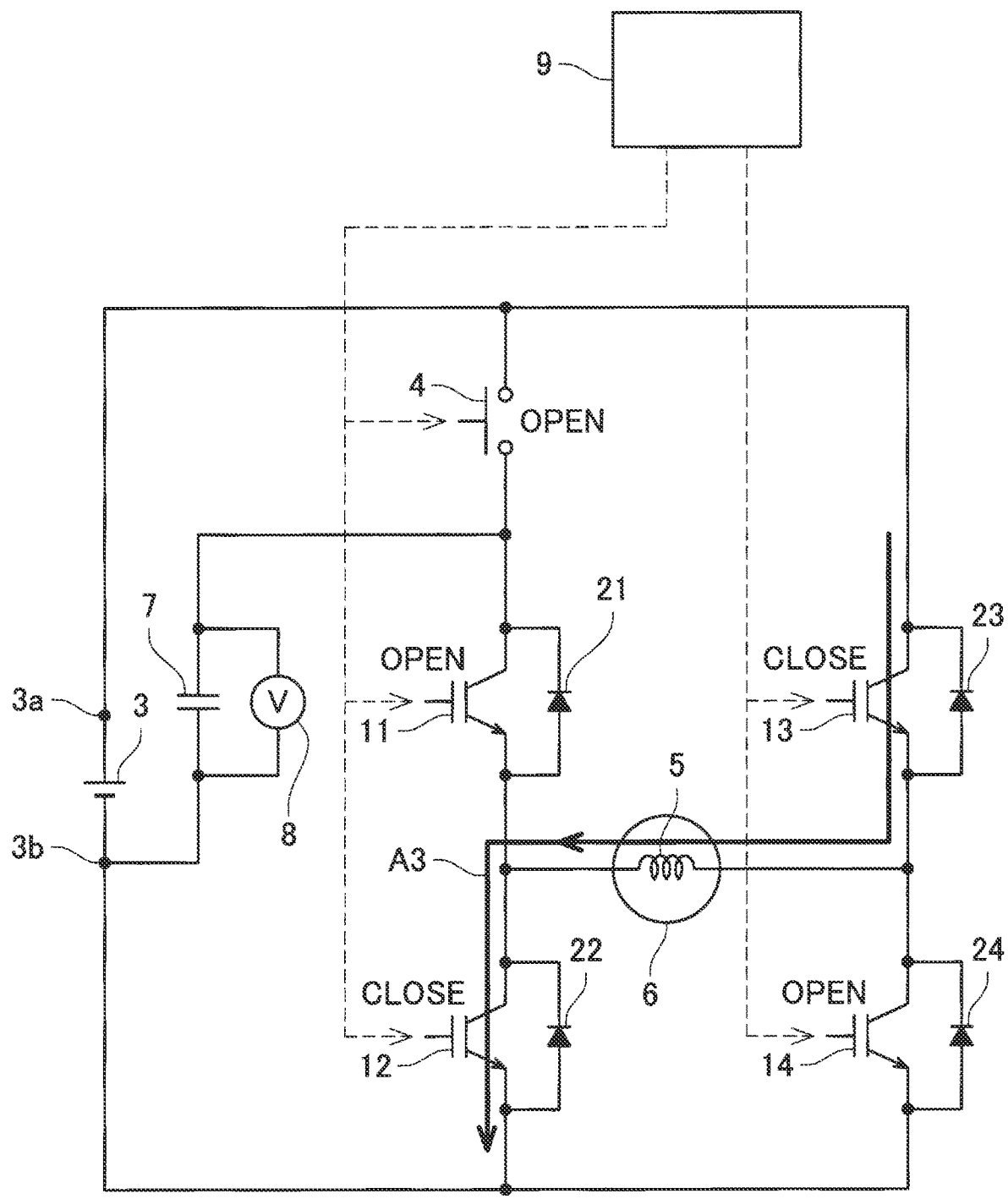
FIG. 5 is a circuit diagram showing the flow of current at the time of step-up (when a second switching element is closed)
Figure 6:
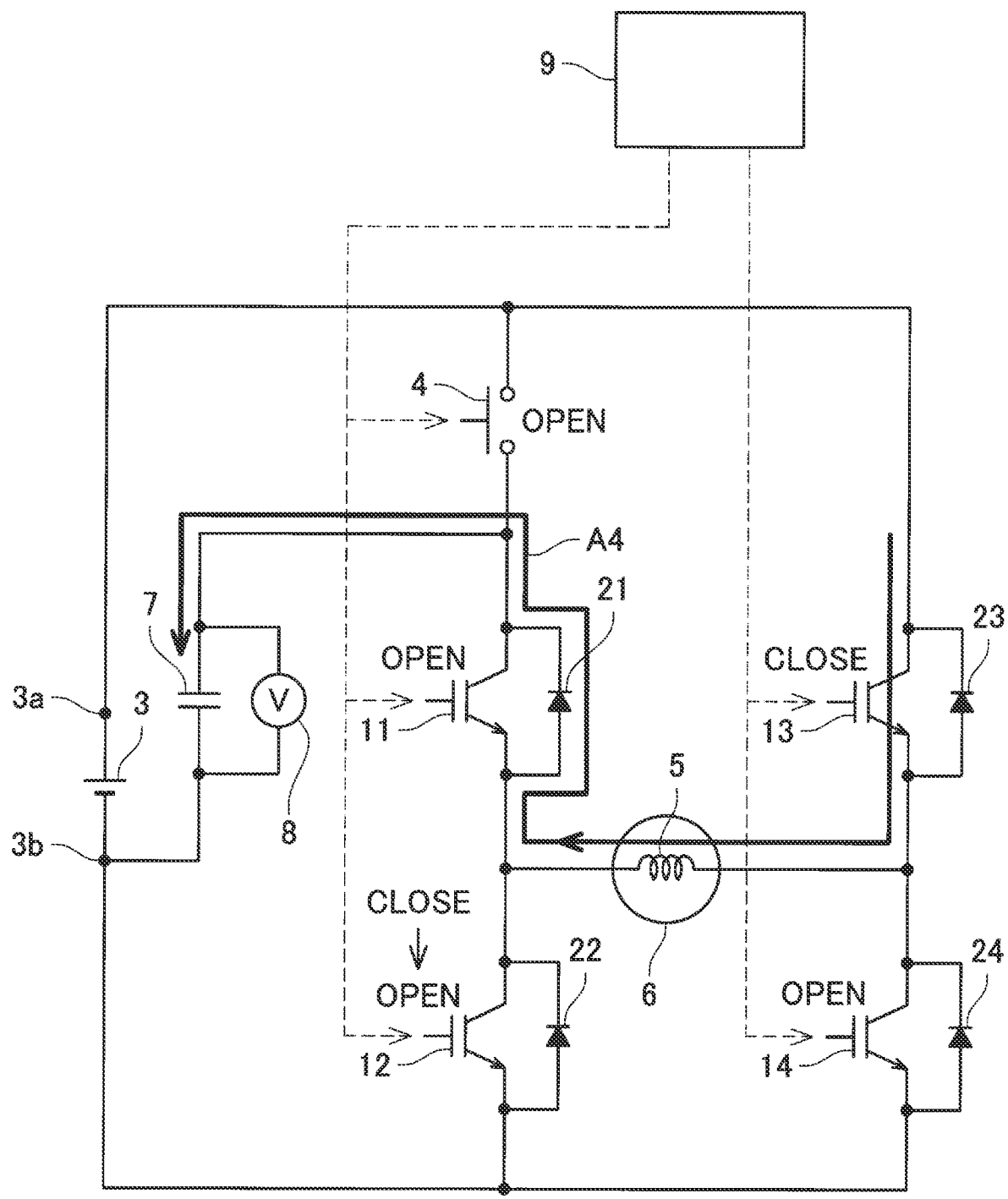
FIG. 6 is a circuit diagram showing the flow of current at the time of step-up (when the second switching element is opened)

FIG. 5 is a circuit diagram showing the flow of current in closing the second switching element 12. FIG. 6 is a circuit diagram showing the flow of current in opening the second switching element 12. Each of thick directional lines A3 and A4 indicates the flow of current. In both FIGS. 5 and 6, the shutoff switch 4, the first switching element 11, and the fourth switching element 14 are held open. Besides, the third switching element 13 is held closed.

The third switching element 13 is closed, so the coil 5 is connected at one end thereof to the positive electrode 3a of the electric power supply 3. As shown in FIG. 5, when the second switching element 12 is closed, the coil 5 is connected at the other end thereof to the negative electrode 3b, and a current flows through the coil 5 (as indicated by the thick directional line A3). The thick directional line A3 is the same as the thick broken directional line A2 in FIG. 1. That is, when the second switching element 12 is closed, a current flows through the coil 5 in such a direction as to close the valve 32. The valve 32 is closed and hence does not move. Electric energy is stored into the coil 5 due to the flow of the current through the coil 5.

Subsequently, when the second switching element 12 is opened, the coil 5 is disconnected at the other end thereof from the negative electrode 3b, and the current stops flowing from the coil 5 to the negative electrode 3b. An induced electromotive force is produced in the coil 5 in such a manner as to compensate for the loss in current. Due to this induced electromotive force, the output voltage of the electric power supply 3 is stepped up. A current produced by the induced electromotive force flows to the capacitor 7 through the diode 21. The thick directional line A4 in FIG. 6 indicates the flow of current from the coil 5 to the capacitor 7. The capacitor 7 is charged by the current resulting from the induced electromotive force. The voltage of the capacitor 7 becomes higher than the output voltage of the electric power supply 3. Every time the opening/closing of the second switching element 12 is repeated, the current flows as shown in FIGS. 5 and 6, and the voltage of the capacitor 7 becomes higher.

Returning to FIG. 4, the description of the step-up valve driving process will be resumed. The controller 9 monitors the voltage of the capacitor 7 by the voltage sensor 8. The controller 9 repeatedly opens/closes the second switching element 12 until the voltage of the capacitor 7 becomes higher than a predetermined threshold voltage (NO in step S5, S4). A value higher than the output voltage of the electric power supply 3 is set as the threshold voltage.

Figure 7:
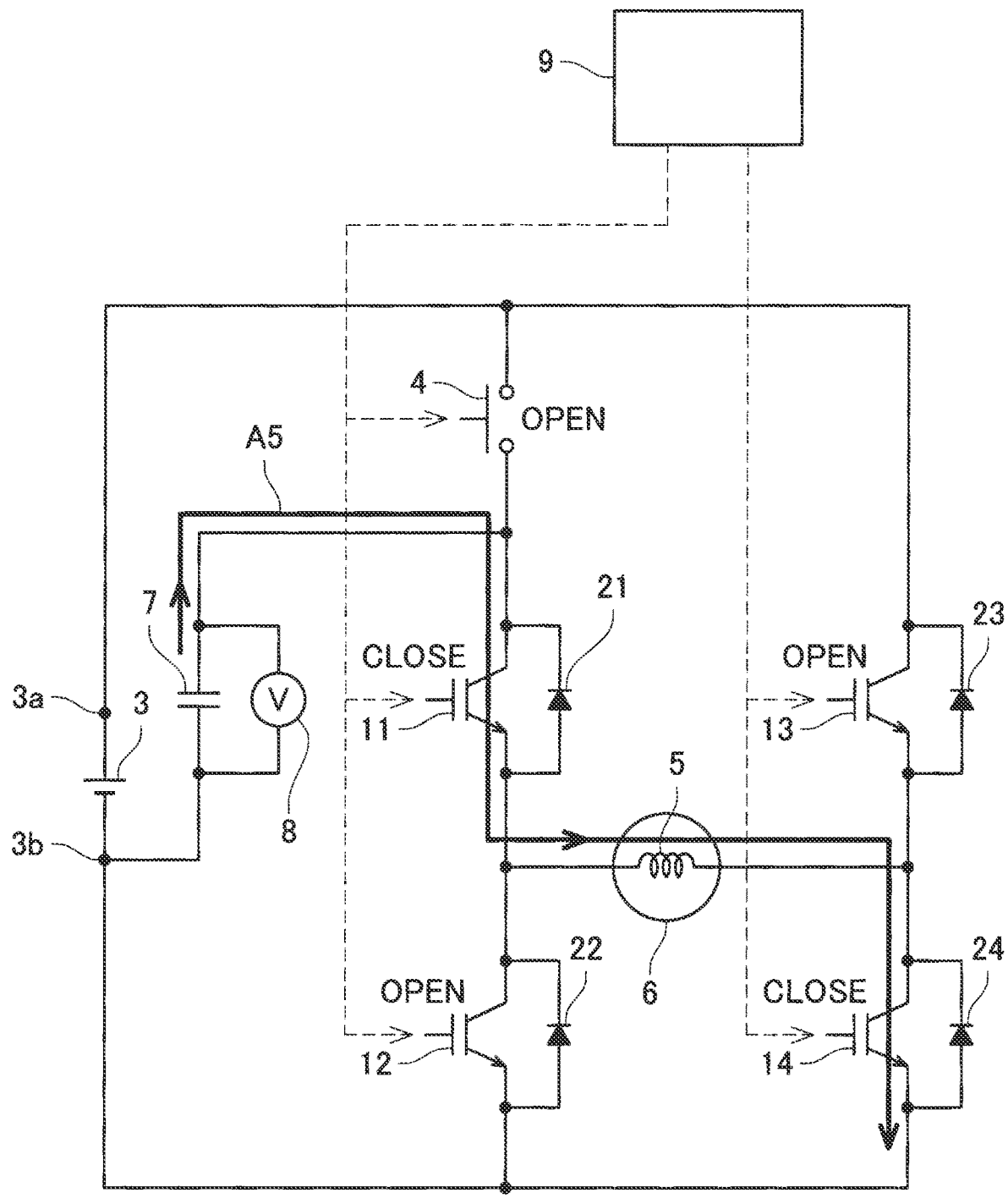
FIG. 7 is a circuit diagram showing the flow of current from a capacitor to a coil.

When the voltage of the capacitor 7 exceeds the threshold voltage, the controller 9 opens the second switching element 12 and the third switching element 13, and closes the first switching element 11 and the fourth switching element 14 (YES in step S5, S6). The electric power with which the capacitor 7 is charged flows to the coil 5 through the first switching element 11. The current that has flowed through the coil 5 flows to the negative electrode 3b through the fourth switching element 14. A thick directional line A5 in FIG. 7 indicates the flow of current at this time. The thick directional line A5 is oriented in the same direction as the thick directional line A1. A current flows through the coil 5 in such a direction as to open the valve 32, at a voltage higher than the output voltage of the electric power supply 3. Thus, a larger driving force than the normal driving force is applied in such a direction as to open the valve 32.

As described above, the valve system 2 can move the valve by a driving force larger than usual, through the use of the switching elements 11 to 14 that change the direction of the current flowing through the coil 5, and the capacitor 7. The valve system 2 can exert a larger driving force than usual, simply by adding the shutoff switch 4 and the capacitor 7 to the H-circuit.

When the valve 32 opens in the step-up valve driving process, the controller 9 returns to normal valve control. When the valve 32 does not open after performing the step-up valve driving process once, the controller 9 repeats the step-up valve driving process. When the valve 32 does not open even after repeating the step-up valve driving process a predetermined number of times, the controller 9 transmits a signal indicating the uncontrollability of the valve to the high-order host controller.

Figure 8:
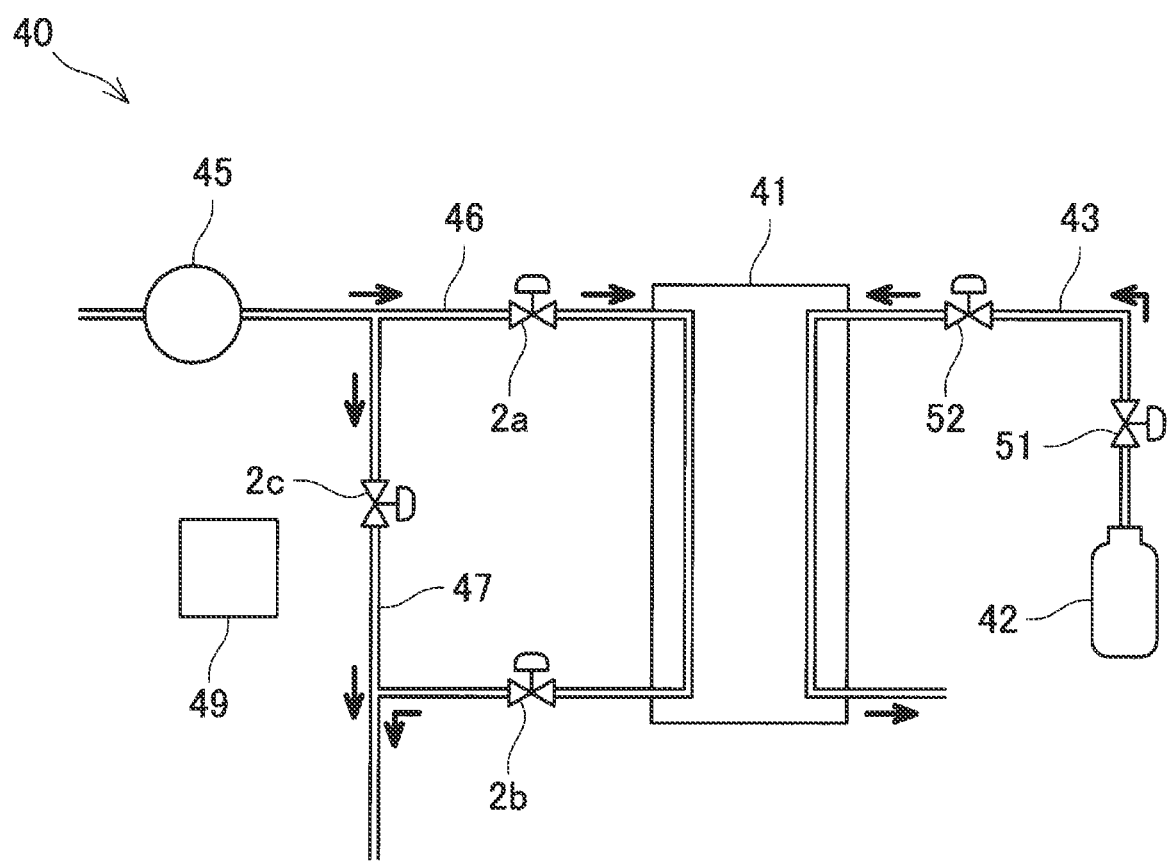
FIG. 8 is a block diagram of a fuel cell system in which the valve system according to the embodiment is adopted.

The valve system 2 according to the embodiment is adopted in, for example, a fuel cell system 40. FIG. 8 is a block diagram showing the fuel cell system 40. The fuel cell system 40 generates electric power by a fuel cell stack 41. For the sake of simplified illustration, the fuel cell stack 41 will be referred to hereinafter as an FC stack 41.

The FC stack 41 and a hydrogen tank 42 are connected to each other by a fuel pipe 43. The fuel pipe 43 is equipped with a main stop valve 51 and an injector 52. When the main stop valve 51 is opened, hydrogen gas is supplied from the hydrogen tank 42. After the pressure of the hydrogen gas supplied from the hydrogen tank 42 is adjusted by the injector 52, this hydrogen gas is delivered to the FC stack 41.

Air (oxygen) is delivered to the FC stack 41 via an air pipe 46. An air compressor 45 compresses air at an atmospheric pressure, and supplies this air to the FC stack 41 through the air pipe 46. A bypass pipe 47 that bypasses the FC stack 41 is connected to the air pipe 46. The air pipe 46 is equipped with air valves 2a and 2b. The air valve 2a is arranged upstream of the FC stack 41, and the air valve 2b is arranged downstream of the FC stack 41. The bypass pipe 47 is equipped with an air valve 2c. Each of thick directional lines in FIG. 8 indicates the flow of hydrogen gas or air. Although not shown in the drawing, the air pipe 46 is equipped with a flow rate sensor that measures a flow rate of air flowing through the pipe.

The air valves 2a to 2c, the main stop valve 51, and the injector 52 are controlled by a host controller 49. The valve system 2 according to the embodiment is adopted in the air valves 2a, 2b, and 2c. Accordingly, each of the air valves 2a to 2c is equipped with the controller 9. A command is delivered from the host controller 49 to each of the air valves 2a to 2c as necessary. The controller 9 of each of the air valves 2a to 2c drives the valve 32 (see FIGS. 2 and 3) in accordance with a command from the host controller 49.

FIG. 9 is a flowchart showing a process that is performed by the controller 9 that has received a command to open the valve (a valve opening command). In FIG. 9, each sign "SW" means "switching element(s)". The controller 9 that has received the valve opening command opens the first switching element 11 and the fourth switching element 14, and closes the second switching element 12 and the third switching element 13 (step S12). The controller 9 determines whether or not the valve 32 has opened, based on a signal from a sensor that detects an open/closed state of the valve 32 (step S13). If the opening of the valve 32 is detected, the process is ended (YES in step S13). If the opening of the valve 32 cannot be detected, the controller 9 receives data on a supply amount of air from the foregoing flow rate sensor, and checks the supply amount of air. If the supply amount of air is a positive value although it is determined in the processing of step S13 that the valve 32 is not open (YES in step S14), it can be determined that there is a malfunction in either the sensor detecting the opening of the valve or the flow rate sensor. In this case, the controller 9 transmits a signal for notification of the malfunction (a malfunction notification signal) to the high-order host controller 49 (step S15).

If the result of the determination in step S14 is NO, namely, if the supply amount of air is equal to zero, it can be determined that the valve 32 is not open, so the controller 9 performs the step-up valve driving process (NO in step S14, S16). The step-up valve driving process has been described with reference to FIG. 4, and the valve system 2 (the air valves 2a to 2c) attempts to open the valve 32 by a driving force exceeding the normal driving force.

After performing the step-up valve driving process (step S16), the controller 9 passes through step S17 and confirms again whether or not the valve 32 has opened (NO in steps S16 and S17, S13). If the valve 32 is open, the controller 9 ends the process (YES in step S13). If the opening of the valve 32 cannot be detected, the controller 9 repeats the processing of steps S14 and S16. If the valve does not open although the step-up valve driving process has been repeated N times, the controller 9 determines that the valve 32 cannot be opened, and transmits a signal for notification of a malfunction (a malfunction notification signal) to the host controller 49 (YES in step S17, S15). Thus, in the case where the valve cannot be opened by the normal driving force, the air valves 2a to 2c attempt to open the valve 32 by a driving force exceeding the normal driving force.

A point to remember about the art described in the embodiment will be described. In the embodiment, the actuator that moves the valve is the motor 6 including the coil 5. The actuator that moves the valve is not required to be a motor. For example, the actuator of the valve may be a solenoid including a coil.

What is claimed is:

1. An electrically operated valve system comprising:
a first switching element and a second switching element connected in series to each other between a positive electrode and a negative electrode of an electric power supply;
a third switching element and a fourth switching element connected in series to each other between the positive electrode and the negative electrode;
diodes connected in antiparallel to the first switching element, the second switching element, the third switching element, and the fourth switching element respectively;
a coil connected between a first middle point and a second middle point, the first middle point being a point of series connection of the first switching element and the second switching element, the second middle point being a point of series connection of the third switching element and the fourth switching element, the coil being wired such that a valve opens when the second switching element and the third switching element are opened and the first switching element and the fourth switching element are closed;
a shutoff switch configured to shut off a path between a positive electrode of the first switching element and the electric power supply, wherein the shutoff switch is positioned so as to shut off the path between the positive electrode of the first switching element and the electric power supply without shutting off a path between a positive electrode of the third switching element and the electric power supply; and
a capacitor connected at one end of the capacitor between the shutoff switch and the first switching element and connected at the other end of the capacitor to the negative electrode of the electric power supply.

2. The electrically operated valve system according to claim 1, further comprising:
a controller configured to control the first switching element, the second switching element, the third switching element, the fourth switching element, and the shutoff switch, wherein
the controller is configured to:
repeatedly open and close the second switching element until a voltage of the capacitor exceeds a threshold voltage higher than an output voltage of the electric power supply, while holding the shutoff switch, the first switching element, and the fourth switching element open and holding the third switching element closed; and
open the second switching element and the third switching element and close the first switching element and the fourth switching element when the voltage of the capacitor exceeds the threshold voltage.

3. The electrically operated valve system according to claim 2, wherein
the controller is configured to repeatedly open and close the second switching element until the voltage of the capacitor exceeds the threshold voltage higher than the output voltage of the electric power supply, while holding the shutoff switch, the first switching element, and the fourth switching element open and holding the third switching element closed, and open the second switching element and the third switching element and close the first switching element and the fourth switching element when the voltage of the capacitor exceeds the threshold voltage, in a case where the valve cannot be opened by the output voltage of the electric power supply.

* * * * *